(12) United States Patent
Onomatsu et al.

(10) Patent No.: US 7,663,704 B2
(45) Date of Patent: Feb. 16, 2010

(54) TELEVISION TUNER FOR CONTROL OF DIRECTIVITY OF ANTENNA

(75) Inventors: Takehiro Onomatsu, Osaka (JP); Kazuhiko Yamamoto, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 12/412,037

(22) Filed: Mar. 26, 2009

(65) Prior Publication Data

US 2009/0180037 A1 Jul. 16, 2009

Related U.S. Application Data

(62) Division of application No. 11/142,653, filed on Jun. 1, 2005, now abandoned.

(30) Foreign Application Priority Data

Jun. 2, 2004 (JP) ............................. 2004-164837

(51) Int. Cl.
*H04N 5/50* (2006.01)
(52) U.S. Cl. ..................................... 348/732
(58) Field of Classification Search ........................ None
See application file for complete search history.

(56) References Cited

U.S. PATENT DOCUMENTS

| 5,818,543 | A * | 10/1998 | Lee | 348/725 |
| 6,009,124 | A * | 12/1999 | Smith et al. | 375/267 |
| 6,313,886 | B1 * | 11/2001 | Sugiyama | 348/731 |
| 6,577,353 | B1 * | 6/2003 | Welles et al. | 348/706 |
| 6,985,190 | B1 * | 1/2006 | Klopfenstein et al. | 348/569 |
| 7,006,040 | B2 * | 2/2006 | Henderson et al. | 342/372 |
| 7,277,686 | B2 * | 10/2007 | Gierl et al. | 455/277.1 |
| 7,380,263 | B2 * | 5/2008 | Shintani | 725/59 |
| 7,525,603 | B2 * | 4/2009 | Onomatsu | 348/732 |
| 7,564,503 | B2 * | 7/2009 | Onomatsu | 348/732 |
| 7,600,247 | B2 * | 10/2009 | Onomatsu | 725/72 |
| 2003/0228857 | A1 * | 12/2003 | Maeki | 455/278.1 |

FOREIGN PATENT DOCUMENTS

| JP | H-06-113220 A | 4/1994 |
| JP | H06-113220 A | 4/1994 |
| JP | H11-298226 A | 10/1999 |

OTHER PUBLICATIONS

Japanese Notice of the reason for refusal, dated Nov. 11, 2009.

* cited by examiner

*Primary Examiner*—Paulos M Natnael
(74) *Attorney, Agent, or Firm*—Yokoi & Co., U.S.A., Inc.; Peter Ganjian

(57) ABSTRACT

Disclosed is a television tuner for receiving television broadcast signals with an antenna, which is equipped with an auto-scan unit that causes a channel storing section, which stores a receiving channel at the time when the signal condition from a tuner section matches the predetermined signal condition, to automatically store the receiving channel, wherein the auto scan unit detects switches among the receiving channel sequentially in the tuner section to detect the signal condition, and, after signal condition is detected for every channel, performs a variable directivity control for the antenna, resulting in an increased auto-scan execution speed.

2 Claims, 8 Drawing Sheets

FIG. 5

| Channel number | Frequency band (MHz) | Receiving direction pattern |
|---|---|---|
| 2 | 90~96 | D=1 |
| 5 | 108~114 | D=5 |
| 7 | 126~132 | D=12 |
| 9 | 168~174 | D=7 |
| 10 | 174~180 | D=9 |
| 12 | 192~198 | D=14 |
| 14 | 210~216 | D=0 |
| 18 | 240~246 | D=5 |
| 20 | 258~264 | D=4 |
| ⋮ | ⋮ | ⋮ |
| 69 | 312~318 | D=11 |

TELEVISION TUNER FOR CONTROL OF DIRECTIVITY OF ANTENNA

CROSS-REFERENCES TO RELATED APPLICATIONS

This Application is a DIVISIONAL application claiming the benefit of priority of the co-pending prior U.S. Utility Non-Provisional patent application Ser. No. 11/142,653, with a filing date of Jun. 1, 2005, which claims the benefit of priority of Japan Patent Application No. 2004-164837, filed Jun. 2, 2004, the entire disclosures of all Applications are expressly incorporated by reference in their entirety herein.

BACKGROUND OF THE INVENTION

1. Field of the Invention

The present invention relates to a television tuner that receives television broadcast signals with an antenna capable of selecting directivity.

2. Description of the Prior Art

In television broadcasting, transmitter location may differ with each broadcasting station. In such a case, to receive the radio wave from a desired station, it is necessary to set up the receiver to receive the desired channel and also to adjust the directivity of the antenna toward the transmitter of the desired station.

Conventionally, there is known a television tuner that is equipped with a smart antenna capable of statically changing the directivity by means of an electrical signal, and that allows finding a direction in which the desired channel can be best received by automatically and omnidirectionaly changing the directivity of the smart antenna (refer to Japanese Patent Laid-Open No. 11-298226, for example).

Also, the above inventor proposes a television tuner that receives television broadcast signals with the above-mentioned smart antenna, wherein the smart antenna is controlled to change the directivity of the smart antenna omnidirectionaly so as to find a direction in which the desired radio wave is best received, and also to switch receiving channels as appropriate and store receiving channels sequentially which give optimum receiving condition. This television tuner allows automatic storing of receiving channels for all the receiving channels when performing an auto-scan to set receivable television channels, and therefore is very convenient.

However, this television tuner is designed to find the optimum receiving condition by changing the directivity of the smart antenna omnidirectionaly for all the receiving channels, as described above. That is, it is necessary to perform the omnidirectional directivity control of the smart antenna as many times as the number of receiving channels repeatedly. Therefore, it will take too much time if all the channels are scanned. In particular, if the number of receivable channels is large this problem is serious, making the user irritated or uncomfortable.

SUMMARY OF THE INVENTION

In view of the above problem, the present invention provides a television tuner that allows a faster auto-scan.

To achieve the above object, one aspect of the present invention is directed to a television tuner that receives television broadcast signals with a smart antenna capable of statically selecting the directivity by means of electric signals, including: a directivity control section that outputs an electric signal to select the directivity of the smart antenna;

a tuner section that receives television broadcast signals in the predetermined band with the smart antenna;

a signal condition detector section that detects the signal condition of a signal from the tuner section by detecting the AGC voltage specifying the gain of a signal from the tuner and/or the bit error rate of a digital signal from the tuner section: and a channel storing section that stores the receiving channel and the receiving direction of the smart antenna when the signal condition of a signal detected by the signal condition detector section matches the predetermined signal condition, by making them corresponding to each other, wherein:

an auto-scan unit is provided that causes the channel storing section to automatically store a plurality of receiving channels: and the auto-scan unit switches the receiving channels at the tuner section sequentially for the receiving channels except for the receiving channels stored in the channel storing section, causes the signal condition detector section to detect signal condition for each receiving channel, and, after signal condition is detected for every receiving channel by the signal condition detector section, causes the directivity control section to perform a variable directivity control for the antenna.

In the aspect of the invention configured as above, the signal condition detector section detects the signal condition of a signal extracted by the tuner section. The channel storing section stores the receiving channel and the receiving direction of the smart antenna when the signal condition of a signal detected by the signal condition detector section matches the predetermined signal condition, by making them corresponding to each other. The auto-scan unit causes the channel storing section to automatically store a plurality of receiving channels.

Furthermore, the auto-scan unit the auto-scan unit switches the receiving channels at the tuner section sequentially, and, after signal condition is detected for every receiving channel by the signal condition detector section, causes the directivity control section to perform a variable directivity control for the antenna. This makes it possible to perform the variable directivity control for the smart antenna with a one-time for every direction, and thereby to increase the execution speed of the auto-scan.

Also, the auto-scan detects signal condition by switching among the plurality of receiving channels except for the receiving channels stored in the channel storing section. That is, if a receiving channel is stored in the channel storing section, the receiving channel at the tuner section is not switched to that receiving channel nor the signal condition is detected. As a result, the execution speed of the auto-scan can be further increased.

Another aspect of the present invention is directed to a television tuner that receives television broadcast signals With an antenna capable of selecting the directivity, including:

a directivity, control section that outputs an electric signal to select the directivity of the antenna;

a tuner section that receives television broadcast signals in the predetermined band with the antenna;

a signal condition detector section that detects the signal condition of a signal output from the tuner section: and a channel storing section that stores the receiving channel when the signal condition of a signal detected by the signal condition detector section matches the predetermined signal condition, wherein:

an auto-scan unit is provided that causes the channel storing section to automatically store a plurality of receiving channels; and the auto-scan unit switches among the receiving channels sequentially for the plurality of receiving channels, causes the signal condition detector section to detect signal condition for each receiving channel, and, after signal condition is detected for every receiving channel by the signal condition detector section, causes the directivity control section to perform a variable directivity control for the antenna.

In the aspect of the invention configured as above, the signal condition detector section detects the signal condition of a signal extracted by the tuner section. The channel storing section stores the receiving channel at the time when the signal condition of a signal detected by the signal condition detector section matches the predetermined signal condition. The auto-scan unit causes the channel storing section to automatically store a plurality of receiving channels.

Furthermore, the auto-scan unit switches the receiving channels at the tuner section sequentially, and, after signal condition is detected for every receiving channel by the signal condition detector section, causes the directivity control section to perform a variable directivity control for the antenna. This makes it possible to perform the variable directivity control for the smart antenna with a one-time for every direction, and thereby to increase the execution speed of the auto-scan.

In the aspect of the present invention, the auto-scan unit, after a receiving channel is stored by the channel storing section, will not switch to that receiving channel thereafter.

In this configuration, if a receiving channel is stored in the channel storing section, switching to that receiving channel will not be made nor the detection of signal condition will be performed thereafter, thus further increasing the execution speed of the auto-scan.

In the aspect of the present invention, the channel storing section may be so designed as to store the receiving channel and the receiving direction of the antenna at the time when the signal condition of a signal detected by the signal condition detector section matches the predetermined signal condition, by making them corresponding to each other.

In this configuration, since the receiving direction of the antenna as well as the receiving channel at the time when the signal condition of a signal detected by the signal condition detector section matches the predetermined signal condition are stored, it is possible to make the adjustment of the antenna directivity quickly when a channel change command is input from the remote control or the like.

In the aspect of the present invention, the antenna may be designed such that it is a smart antenna capable of statically selecting the directivity with an electric signal, and that the antenna control section outputs an electric signal to statically select the directivity of the smart antenna.

In this configuration, since it is possible to statically select the directivity of the smart antenna with an electric signal from the antenna control section, thus shortening the time needed for variable directivity control for the smart antenna for every direction.

In the aspect of the present invention, the signal condition detector section is designed to be an AGC circuit that detects the AGC voltage specifying the gain of a signal from the tuner section.

In this configuration, it is possible to store the receiving direction in which the signal condition of an intermediate frequency from the tuner section is good.

In the aspect of the present invention, the signal condition detector section may be designed to be a demodulator circuit that detects the bit error rate of a digital signal from the tuner section.

In this configuration, it is possible to store the receiving direction in which the bit error rate of a signal from the tuner is lower.

Note that each section and each unit of the television tuner of the present invention may be contained in a television. That is, the present invention can be applied to a television having a tuner function.

BRIEF DESCRIPTION OF THE DRAWINGS

FIG. 5 is shows an example of channel selection data;

DESCRIPTION OF THE PREFERRED EMBODIMENTS

Figure 1:
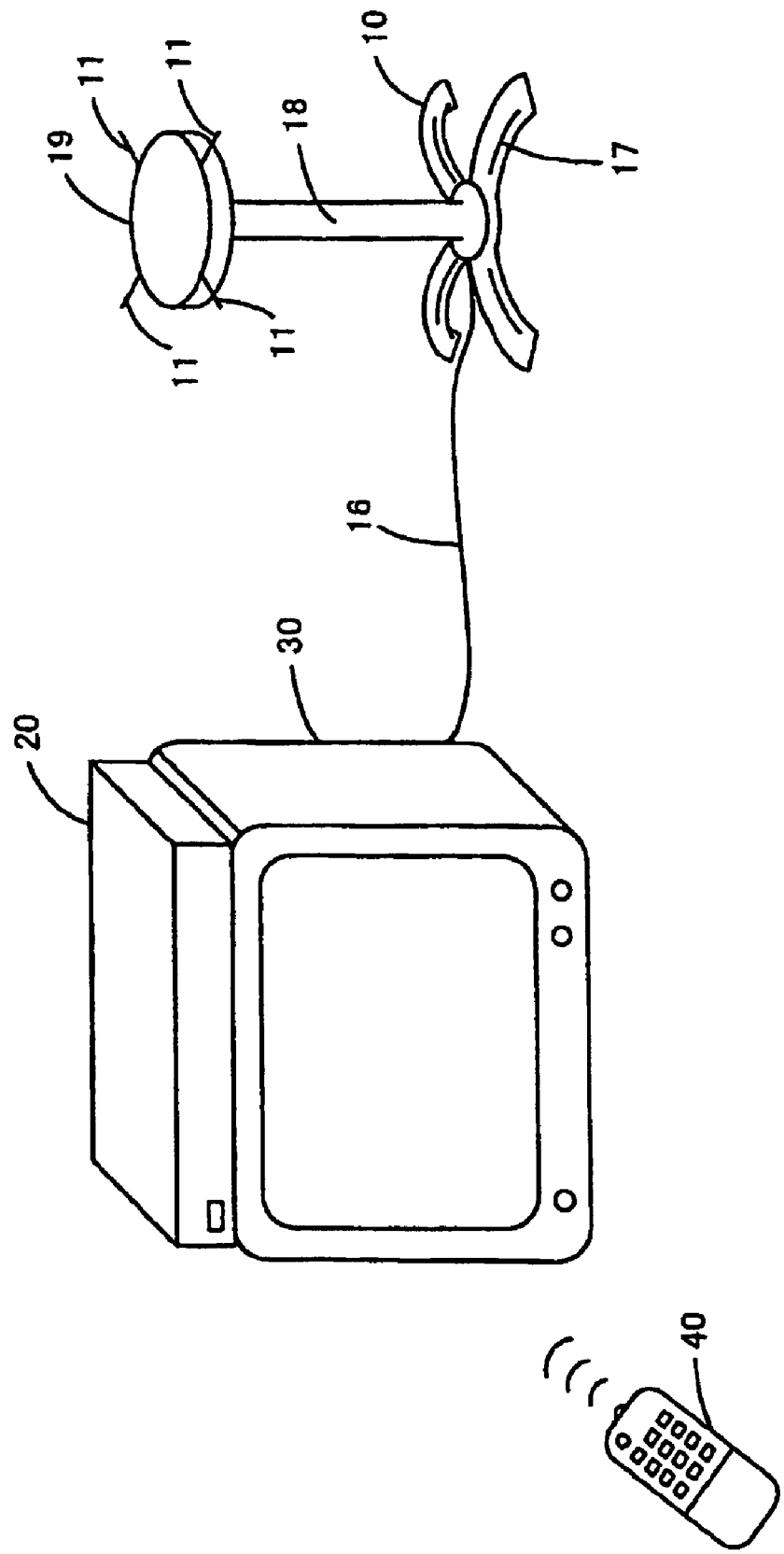
FIG. 1 is a block diagram showing the configuration of a television receiving system.

FIG. 1 shows the basic configuration of a television receiving system equipped with a television tuner according to the present invention. In the figure, a television 30 and a rough rectangular box-shaped television tuner 20 connected to the television 30 with a not shown cable are shown. The television tuner 20 is a so-called set-top box and can be placed at any location if connectable to the television 30. Connected to the television tuner 20 is an antenna cable 16, through which the television tuner 20 is connected to a smart antenna unit 10.

The smart antenna unit 10 has a foot 17 at the bottom for stable installation, and a roughly column-shaped leg 18 standing almost vertically on the foot 17. At the top of the leg 18, a roughly square-shaped (seen from top) plate-like antenna holder 19 is mounted. The antenna holder 19 is to be almost horizontal and four rod-like directional antennae 11 are projecting outward radially from the side. Since the angle formed by adjacent directional antennae 11 is to be 90 degrees, the directional antennae 11 are disposed with even spacing from each other around the circumference of the antenna holder 19. Furthermore, each of the directional antennae 11 is extendable and the user can extend them as needed. It is possible to control the directivity of the smart antenna unit 10 omnidirectionaly by changing the predetermined phase of radio waves received by these directional antennae 11. This configuration enables adjusting the directivity of the antenna to any direction from which terrestrial television airwave is transmitted to the smart antenna unit 10. This makes it possible for the user to receive more broadcast channels and enjoy more television programs.

Figure 2:
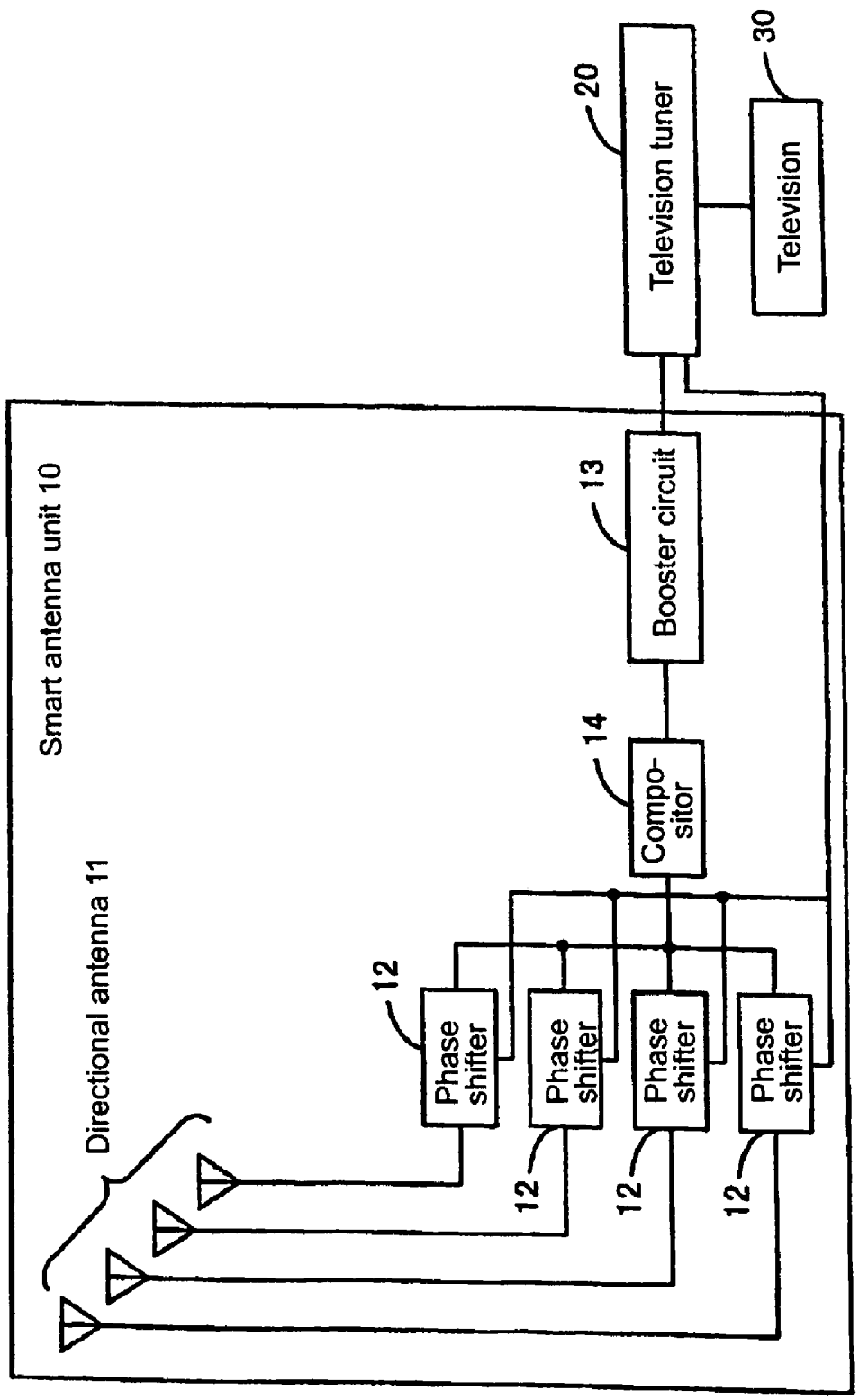
FIG. 2 is a block diagram showing the internal configuration of a smart antenna unit.

FIG. 2 shows the internal configuration of the smart antenna unit 10 schematically. In this figure, the four directional antennae 11 are connected to four phase shifters 12 respectively with separate wires. The phase shifter 12 is a circuit that can control the phase shift amount of a signal input from the directional antenna 11, and can delay the phase according to the bias voltage output from the television tuner 20. The signal whose phase shift amount has been controlled by each phase shifter 12 is input to a compositor 14 to be composed therein. The signal composed by the compositor 14 is input to a booster circuit 13 to be amplified.

Thus, varying and composing the phase of a signal that has been input from each of the four directional antennae 11 enables the four directional antennae 11 to have the directivity for any direction including their axial directions. That is, by setting the phase shift amount of each phase shifter 12 to an appropriate value, it is possible to set the direction of the main beam formed by the smart antenna unit 10 to any direction.

Figure 3:
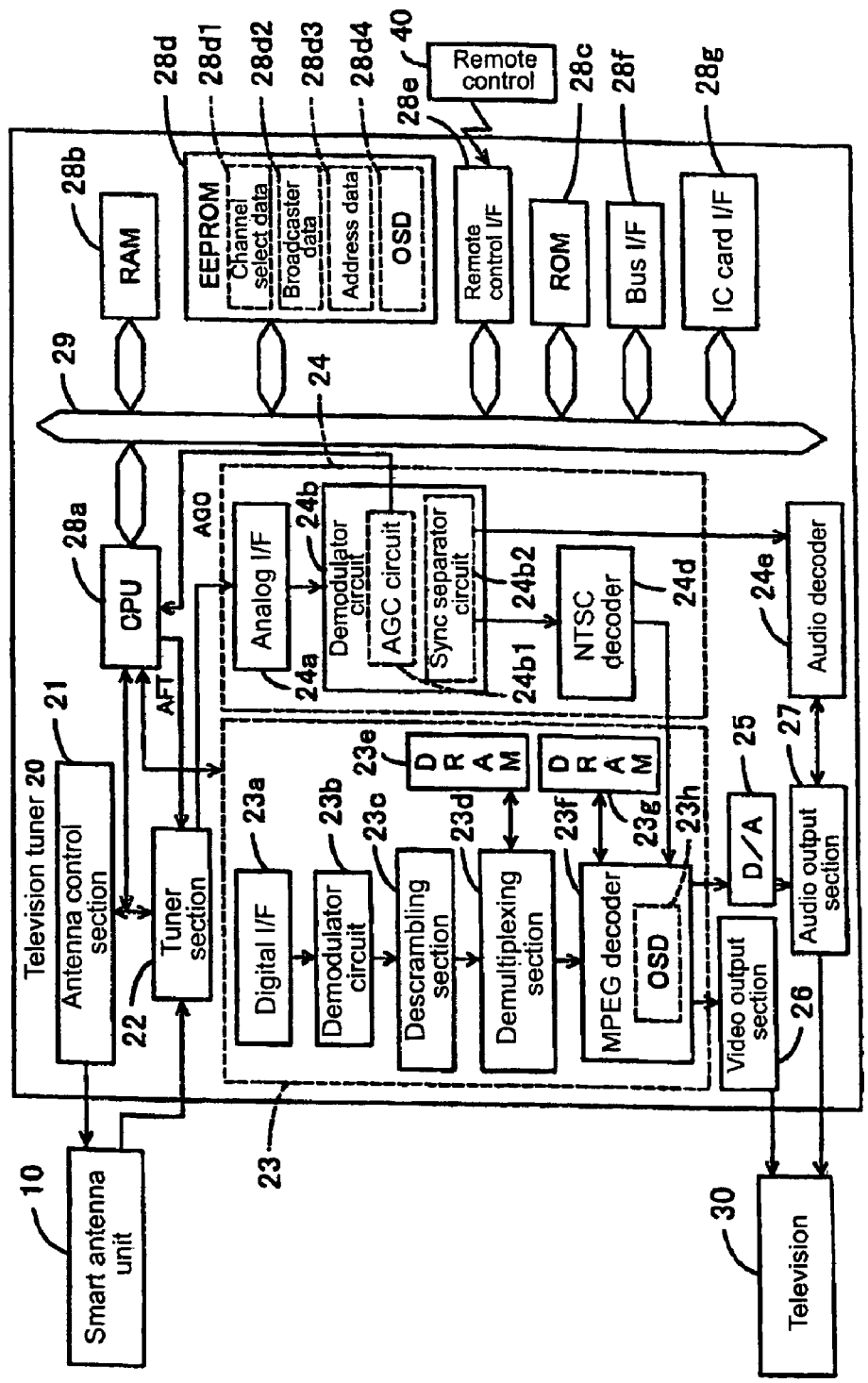
FIG. 3 is a block diagram showing the internal configuration of a television tuner.

FIG. 3 shows the internal configuration of the television tuner 20 schematically. In the figure, the television tuner 20 comprises an antenna control section 21 that controls the phase shift amount by the phase shifter 12 in the smart antenna unit 10, and a tuner section 22 that inputs frequency signals from the smart antenna unit 10. The television tuner 20 generates a signal to control the directivity of the antenna of the smart antenna unit 10 according to a command from a CPU 28a. Specifically, the receiving direction of the smart antenna unit 10 is varied by varying the bias voltage to be output to each phase shifter 12. The television tuner 20 contains a ROM (not shown) to store the combination of bias voltages to be output to each phase shifter 12. 16 patterns of the bias voltage combination are stored, and the television tuner 20 outputs one of these patterns to each phase shifter 12 according to the command from the CPU 28a.

Figure 4:
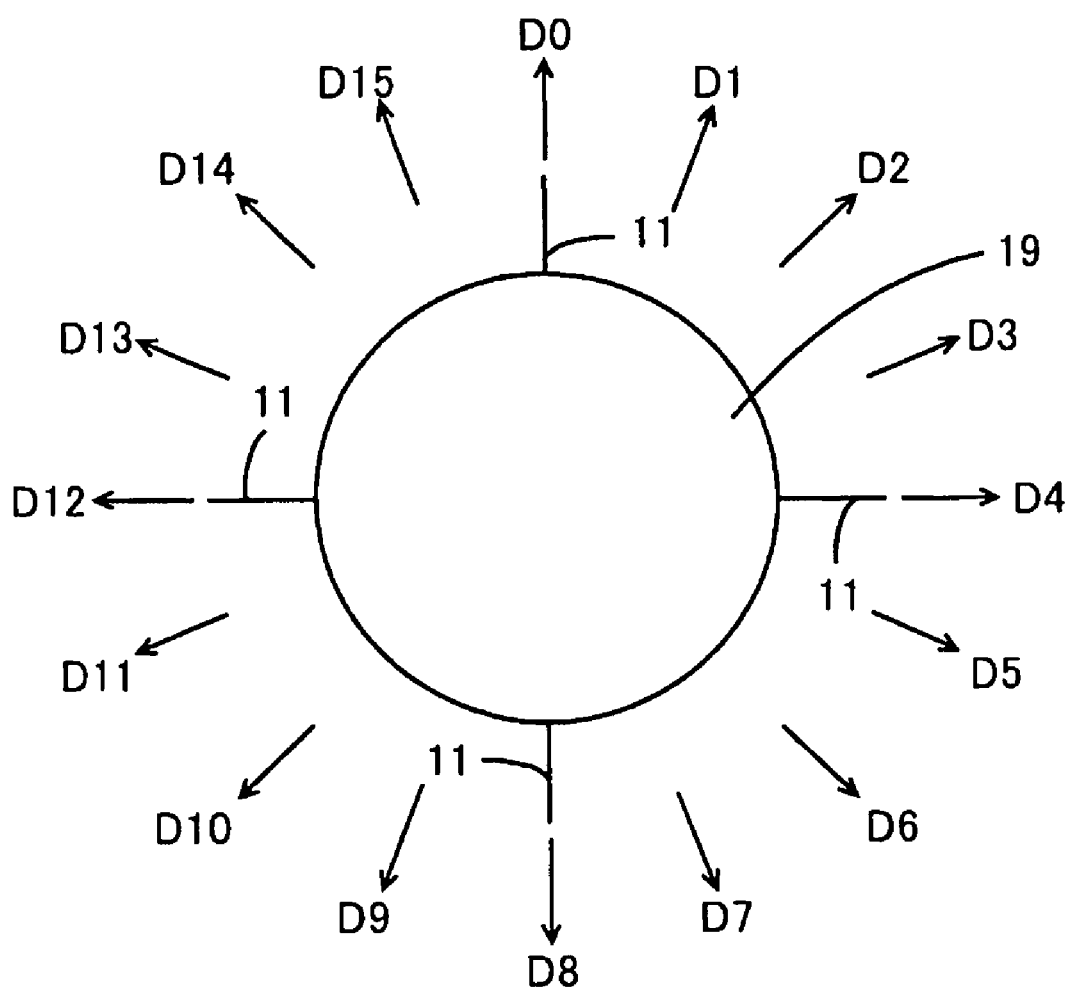
FIG. 4 is conceptual diagram illustrating the smart antenna unit.

This configuration enables the smart antenna unit 10 to realize 16 receiving directions. FIG. 4 shows these 16 receiving directions. As can be seen, it is possible to set evenly spaced 16 receiving directions radiating from the antenna holder 19. That is, the angle difference between any adjacent receiving directions is 360/16=22.5 degrees. Thus, by setting the evenly spaced receiving directions radiating from the antenna holder 19, it is possible to set the directivity to any direction from which airwave arrives. The receiving direction "D" is defined to identify the direction at the top of the figure as D=0, the next direction clockwise as D=1, the next as D=2, the next as D=3, and the last direction as D=15.

The tuner section 22 shown in FIG. 3 has a so called synthesizer-tape tuner configuration, and PLL data i.e. frequency division ratio data in a PLL loop is supplied to the tuner section 22 as the channel selection signal. Also, the tuner section 22 selects one receiving channel out of a plurality of receiving channels by extracting a frequency signal in the desired frequency band when the PLL data is received as the channel selection signal from the CPU 28a. The CPU 28a detects a frequency shift in the tuner section 22, and supplies an AFT voltage to the tuner section 22 based on the detection result. Then, the tuner section 22 corrects the frequency band to be extracted according to the AFT voltage for optimal channel selection.

The output of the tuner section 22 is supplied to either of a digital reproduction section 23 and an analog reproduction section 24. That is, the television tuner 20 according to the present invention allows reproduction of both digital broadcast signal and analog broadcast signal. The digital reproduction section 23 comprises a digital I/F 23a, a demodulator circuit 23b, a descrambling section 23c, a demultiplexing section 23d, and an MPEG decoder 23g. The I/F 23a to which the frequency signal is input from the tuner section 22 is equipped with an A/D converter, and the demodulator section that receives the signal from the digital I/F 23a is provided with a channel equalizer, an error correction decode section, and the like.

In other words, the digital I/F 23a and the demodulator circuit 23b converts frequency signal to be input from the tuner section 22 into a digital signal, and also performs a so called ghost cancellation for the digital-demodulated signal based on the control signal from the CPU 28a. Furthermore, the digital I/F 23a and the demodulator circuit 23b correct bit errors that occurred on the transmission path, to obtain the transport stream (TS) output. In this processing, the demodulator circuit 23b detects the ratio of the bit errors to the entire data as bit error rate.

The transport stream obtained by performing demodulation and error correction processing at the demodulator circuit 23b is fed to the descrambling section 23c. Since the transport stream is usually scrambled, it is impossible to reproduce pictures and sounds without descrambling. Therefore, the descrambling section 23c descrambles the transport stream to demodulate the transport stream to data array that can be reproduced. The descrambled transport stream has a format in which video and audio signal and text information are multiplexed, and therefore supplied to the demultiplexing section 23d, where the input data is demultiplexed. The descrambling section 23c and the demultiplexing section 23d can use the DRAM 23e as a work area when performing respective processing.

As the result of the demultiplexing process, the input data is divided into MPEG data in which video and audio signals are compressed in the predetermined method and data other than the video and audio signals, for example text information on TV programs, and the latter data is then provided to the CPU 28a. The former MPEG data is supplied to the MPEG decoder 23g, and is decompressed, i.e. MPEG-decoded, at the MPEG decoder 23g. By MPEG-decoding the MPEG data, digital video and digital audio signals are produced, and the produced digital video signal is further converted to the analog video signal.

The MPEG decoder 23g is equipped with an OSD processing section 23 which allows overlapping a predetermined still picture on the displayed picture or replacing with a predetermined still picture. The OSD processing section 23h can input the received text information data, etc. from the CPU 28a, and produce a still picture, etc. based on the text information data, etc.

The MPEG decoder can use the DRAM 23f as a work area when performing an MPEG-decoding or OSD processing. Thus, the MPEG decoder 23g can perform the decompression and it is possible to perform a graphics processing with the OSD processing section 23g. The video signal that has been decompressed and converted to the analog signal is fed to a video output section 26, and is output to the television 30 by the video output section 26. As a method of outputting analog video signals to the television 30, various methods can be employed including the composite output and the S-Video output.

Meanwhile, the audio signal generated by the MPEG decoding is input to a D/A converter section 25 and converted to the analog audio signal at the D/A converter section 25. This analog audio signal is input to an audio output section 27, and is output to the television 30 from the audio output section 27. However, if the television 30 has an optical input terminal or the like and accepts digital audio signals, it is possible to output a digital audio signal directly to the television 30 without converting it with the D/A converter section 25.

The analog reproduction section 24 comprises an analog I/F 24a, the demodulator circuit 24b, an NTSC decoder 24d, and an audio decoder 24. The analog I/F 24a and the demodulator circuit 24b are equipped with an AGC circuit 24b1 that amplifies an intermediate frequency (IF) signal input from the tuner section 22. The gain of the IF signal at the AGC circuit 24b1 is specified by an ACG voltage, and the AGC voltage varies with the amplitude level of the IF signal amplified by the AGC circuit 24b1. That is, the AGC circuit 24b1 amplifies the IF signal using an AGC voltage as the feedback signal.

Specifically, when the amplified IF signal is strong, the AGC voltage is decreased to lower the gain, and when the IF signal is weak, the AGC voltage is increased to raise the gain. That is, in this embodiment, it can be said that the higher the AGC voltage the weaker the IF signal to be input from the tuner section 2. This enables the amplitude level of the amplified IF signal to be almost constant, thus preventing the difference in reproduced colors among different channels. Furthermore, since the AGC voltage is generated by comparing the amplified IF signal with a predetermined reference voltage, it is possible to maintain the amplitude level of the amplified IF signal at an ideal level. The AGC voltage is output to the CPU 28a, and based on the output AGC voltage, the CPU 28a executes various controls.

The demodulator circuit 24b generates analog video and audio signals in the NTSC format by separating the demodulated IF signals. The generated analog video signals are input to the NTSC decoder 24d, and converted to digital video signals in the CCIR656 format at the NTSC decoder 24d. The NTSC format is a standard format of analog television signals, and includes the signal for color reproduction, the 15.75 kHz horizontal sync signal, the 60 Hz vertical sync signal, etc. The demodulator circuit 24b contains a sync separator circuit 24c to extract the horizontal sync signal and vertical sync signal, and allows the NTSC decoder 24d to generate a synchronized digital video signal based on the horizontal sync signal and vertical sync signal extracted by the sync separator circuit 24c. Meanwhile, the CCIR656 format is a digital video signal format in which each element of the YUV is represented in digital graduation. The analog audio signal separated at the demodulator circuit 24b is supplied to the audio decoder 24e, and separated into right and left stereo audio signals at the audio decoder 24e.

The digital video signal generated at the NTSC decoder 24d is input to the MPEG decoder 23g, and undergoes the OSD processing and the conversion to an analog signal. The converted analog video signal is then fed to the video output section 26, and output to the television 30 from the video output section 26. Meanwhile, the audio signal is input to the audio output section 27, and output to the television 30 from the audio output section 27.

The CPU 28a is connected to a bus 29, and executes the control processing to implement various function of the television tuner 20, using a RAM 28b connected to the bus 29 as a work area. The programs that executes this control processing are pre-stored in a ROM 28c, from which the CPU 28a reads the predetermined program into the RAM 28b as needed to perform the control processing. Also, the bus 29 has a rewritable EEPROM 28d, and the CPU 28a uses various data stored in the EEPROM 28d to execute the control processing.

In the EEPROM 28d, for one example to be stored therein, channel selection data 28d1 is stored. FIG. 5 shows an example of the channel selection data 28d1. The channel selection data 28d1 is a table listing correspondingly the channel numbers of receiving channels that can be selected with a remote control 40 or the like, the frequency bands extracted by the tuner section 22, and the receiving direction patterns "D" in which signal condition is good, and it is possible to identify the frequency band and receiving direction corresponding to the channel number specified by the CPU 28a by referencing this table. In this embodiment, since the tuner section 22 employs the synthesizer method, the correspondence between the channel number and the frequency division data is stored as the channel selection data 28d1. Also, the receiving direction pattern "D" in which signal condition is good is stored as a combination pattern of the bias voltage output to each phase shifter 12 of the smart antenna unit 10.

Thus, by prestoring the channel selection data 28d1, it is possible to receive every channel with optimum condition even if different channels arrive from different directions. Here, receiving every channel with optimum condition means setting the receiving direction of the smart antenna 10 to the direction of the transmitter of the broadcaster corresponding to the channel number of a desired channel. This enables receiving strong broadcast signals, and makes it less likely to be interfered by noises from other directions.

If the channel selection data 28d1 is not stored in the EEPROM 28d, it is necessary to store the channel selection data 28d1 in the EEPROM 28d by inputting a command from the remote control 40 or the like. When the command to store the channel selection data 28d1 is input, the auto-scan processing is performed to produce the channel selection data 28d1. In this auto-scan processing, the signal condition in every direction is automatically detected for one channel number, and also channel number is switched sequentially each time the detection for all directions is done. When a signal condition reaches the predetermined signal condition, the channel number is stored in the EEPROM 28d, together with the corresponding receiving direction pattern "D". In contrast, if the detected signal condition does not reach the predetermined signal condition, the channel number is not stored. It is possible to perform the auto-scan processing if the channel selection data 28d1 is not stored. Even when the channel selection data 28d1 is stored, the channel selection data 28d1 may be updated by inputting a command from the remote control 40 or the like to perform the auto-scan processing.

Furthermore, the OSD data 28d2 for producing an OSD image at the OSD processing section 23h is stored in the EEPROM 28d. The CPU 28a reads the OSD data 28d2 as needed according to the command from the remote control 40 or the operation state of each circuit, and supplies the OSD data 28d2 to the OSD processing section 23h. For example, when the CPU 28a determines that it is necessary to issue a warning to the user, the warning screen reads the OSD data 28d2 that can be produced and instructs the OSD processing section 23h to incorporate the warning screen into the picture.

A remote control I/F 28e is connected to the bus 29, and it is possible to input an infrared blink signal to be output from the remote control 40 that is an external device. This infrared blink signal is sent to the CPU 28a via the bus 29, and the CPU 28a executes the corresponding control processing. To the bus 29, a bus I/F 28f for connecting to an external device through a cable and an IC card I/F 28g for giving and receiving data to and from an IC card are also connected. The information read from the bus I/F 28f or the IC card I/F 28g is sent to the CPU 28a via the bus 29 and processed by the CPU 28a accordingly.

Figure 6:
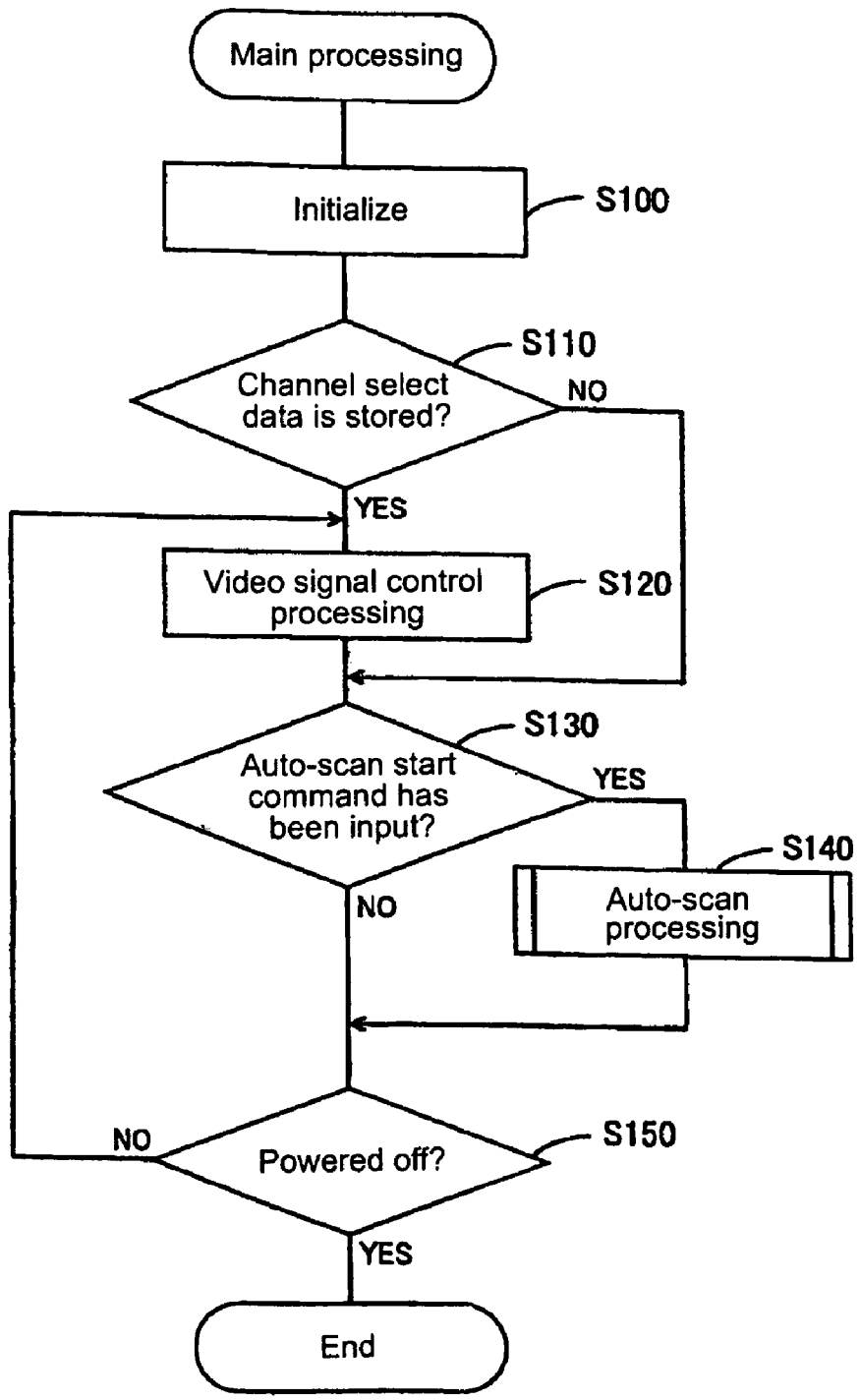
FIG. 6 is a flowchart showing a main processing.

Now, the flow of the main processing to be executed by the television tuner 20 shown in FIGS. 1 and 3 will be described, with reference to the flowchart shown in FIG. 6. First, an initialization is performed in step S101. In this processing, processing for initialization, such as the clearing of the RAM 28b, a register in the CPU 28a, and the reading of the setting data for white balance adjustment from the EEPROM 28d is performed.

In step S110, it is determined whether or not the channel selection data 28d1 is stored in the EEPROM 28d. If the channel selection data 28d1 is stored in the EEPROM 28d, a video signal control processing is performed in step S120. In this processing, the CPU 28a takes the initiative in controlling each section and each circuit constituting the television tuner 20, and performs the processing to display the television image corresponding to the current channel number stored in the EEPROM 28d. Also, during this processing, if a command is issued from the remote control 40 to change a channel number, the PLL data corresponding to the channel number is provided to the tuner section 22 to change the receiving channel.

The processing of step S120 is performed, or if the channel selection data 28d1 is not stored in the EEPROM 28d at step S110, menu selection is made with the remote control 40 in step S130 to check if an auto-scan start command is input. If the auto-scan start command is input, the auto-scan processing is performed at step S140. This auto-scan processing will be described in detail with reference to FIG. 7.

The processing of step S140 is performed, or if it is determined that the auto-scan start command is not input, it is checked whether or not a command to turn off the television tuner 20 is input at step S150. If the command to turn off the television tuner 20 is not input, control is returned to step S120, and if the command is input, the main processing is finished.

Figure 7:
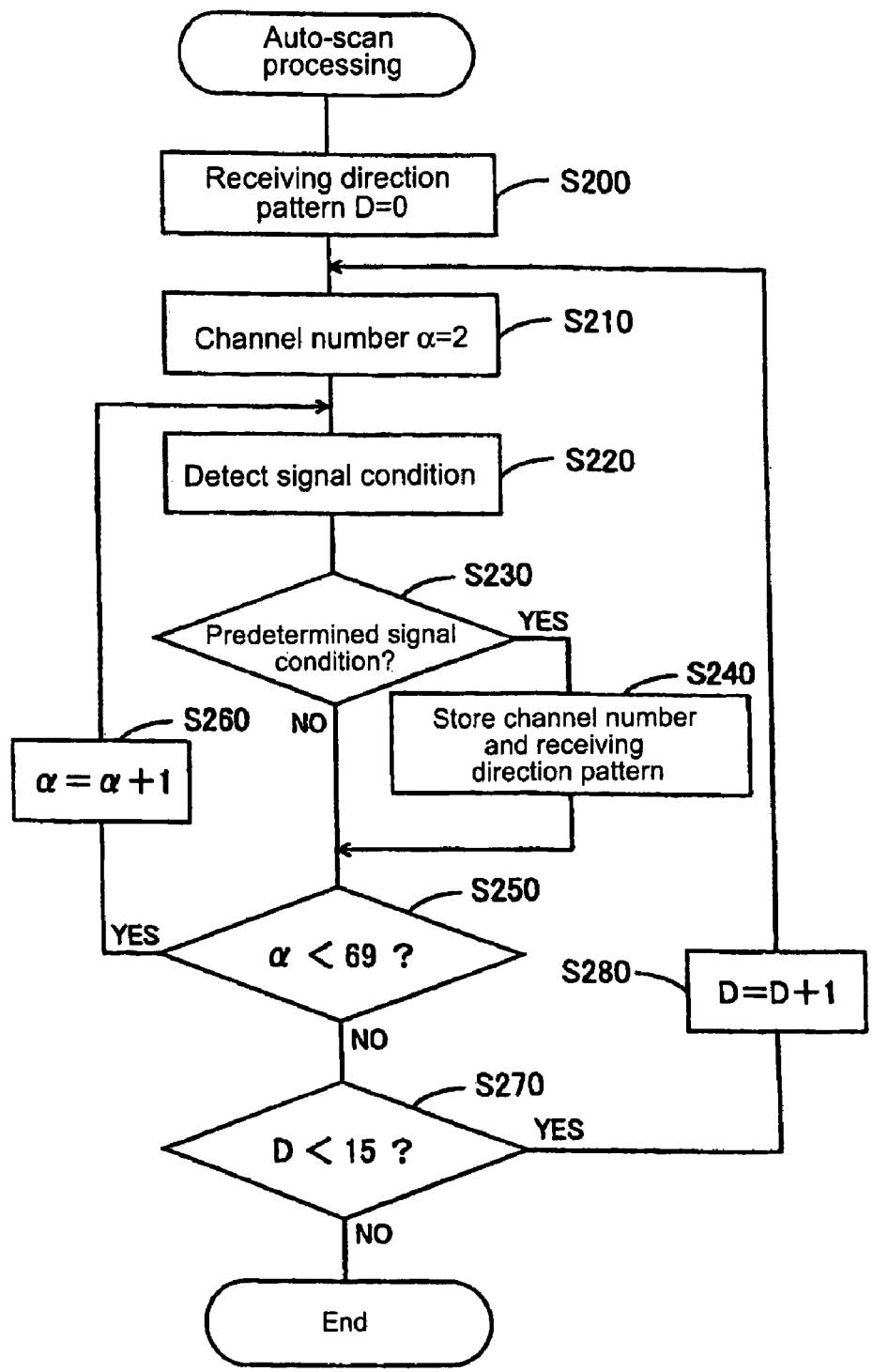
FIG. 7 is a flowchart showing an auto-scan processing that is invoked and executed at step S140 of the flowchart shown in FIG. 6.

Now, with reference to FIG. 7, the flow of auto-scan processing is described that is invoked and executed at step S140. First, the receiving direction pattern "D" is set to D=0 at step S200. Also, a bias voltage corresponding to the set receiving direction pattern (D=0) is supplied to each of the four phase shifters 14 at step S210. This sets the directivity of the smart antenna 10.

Next, the channel number "α" is set to α=2 at step S210. In addition, the processing for providing PLL data corresponding to the set channel number to the tuner section 22 is performed at step S200.

Then, the processing for detecting signal condition is performed at step S220. If a frequency signal output from the tuner section 22 is a digital frequency signal, the signal condition is detected by detecting the bit error rate at the digital I/F 23a and the demodulator circuit 23b. If a frequency signal output from the tuner section 22 is an analog signal, the signal condition is detected from the AGC voltage output from the AGC circuit 24b1 to the CPU 29a.

Next, it is determined whether or not the detected signal condition is the predetermined signal condition. The reference data for determining the signal condition (bit error rate and data on AGC voltage) is stored in the ROM 28 or the like contained in the television tuner 20, and the processing of step S230 determines the detected signal condition based on this data.

If the detected signal condition is the predetermined signal condition at step S230, the processing for storing the channel number and receiving direction pattern is performed at step S240. In this processing the channel number set in the processing at step S200 or at step S280 described below, and the receiving direction pattern "D" that is identified as the predetermined signal condition at step S230 are stored in the EEPROM 28d with them corresponding to each other.

The processing of step S240 is performed, or if the detected signal condition is not the predetermined signal condition at step S230, it is checked if the channel number "α" is α<69. If α<69, the channel number is updated to α=α+1 at step S260 and then control is returned to step S220.

If α=69 (not α<69) at step S250, it is checked if the receiving direction pattern "D" is D<15 at step S270. If D<15, the receiving direction pattern is updated to D=D+1 at step S280 and control is returned to step S210. If D=15 (not D<15), the auto-scan processing is finished.

Now, a specific example of the auto-scan processing shown in FIG. 7 is described with reference to FIG. 5. First, the receiving direction pattern is set to D=0 (step S200), and then the channel number is set to α=2 (step S210). Then, the signal condition at this channel number is detected (step S220) and the detected signal condition is identified (step S230). As shown in FIG. 5, when the receiving direction pattern is D=0 the signal condition is good when the channel number is α=14. In this case, it is determined that the detected signal condition is not the predetermined signal condition, and thus subsequent channel numbers and receiving direction patterns will not be stored.

The signal condition when the receiving pattern is D=0 is detected and identified, and then the channel number is set to α=3 (step S260), the detection and identification of the signal condition is performed for this channel number (steps S220 and S230). According to this procedure, the channel number is incremented by one with the receiving direction pattern is fixed at D=0, and the detection and identification of the signal condition is performed for each channel number. When the channel number is α=14, the signal condition is good, and thus the channel number (α=14) and receiving direction pattern (D=0) for this channel is stored in the EEPROM 28d (step S240). After they are stored, while the channel number is incremented by one, the detection and identification of the signal condition is performed for each channel number, as in the above. When the detection and identification of the signal condition is performed for the channel number α=69, the receiving direction pattern is incremented by one and set to D=1 (step S280) and the channel number is switched within the range of α=2 to 69, and also the detection and identification of the signal condition is performed for each channel number.

Thus, the television tuner 20 detects the signal condition of the frequency signal from the tuner section 22 while switching the channel number within the range α=2 to 69 with the receiving direction pattern fixed, and when α=69 and the detection for all the channels is completed, the receiving direction pattern is switched. Then, when the signal condition becomes the predetermined signal condition for a channel number, the channel number and receiving direction pattern for that channel number are sequentially stored in the EEPROM 28d with them corresponding to each other, in order to produce the channel selection data 28d1.

In FIG. 7, the channel number and receiving direction pattern are stored in the EEPROM 28d at step S240, but the television tuner 20 may be implemented such that only the channel number is stored in the EEPROM 28d. By implementing like this, it is possible to increase the speed of the auto-scan processing since the time for storing the receiving direction pattern will not be needed. Also, since the receiving direction pattern is searched each time a channel number change command is input from the remote control 40 or the like, it is possible to receive television broadcast signals giving stable images continuously.

Described with reference to FIG. 7 is the case where, regardless of whether the channel number is stored in the EEPROM 28d when the detected signal condition matches the predetermined signal condition, all the channel numbers are switched for each receiving direction pattern, and signal condition is detected for every channel number. However, if it is determined that the signal condition for a channel number is the predetermined signal condition, and that channel number is stored in the EEPROM 28d, the television tuner 20 may be implemented such that switching to that channel number will not be made thereafter.

Figure 8:
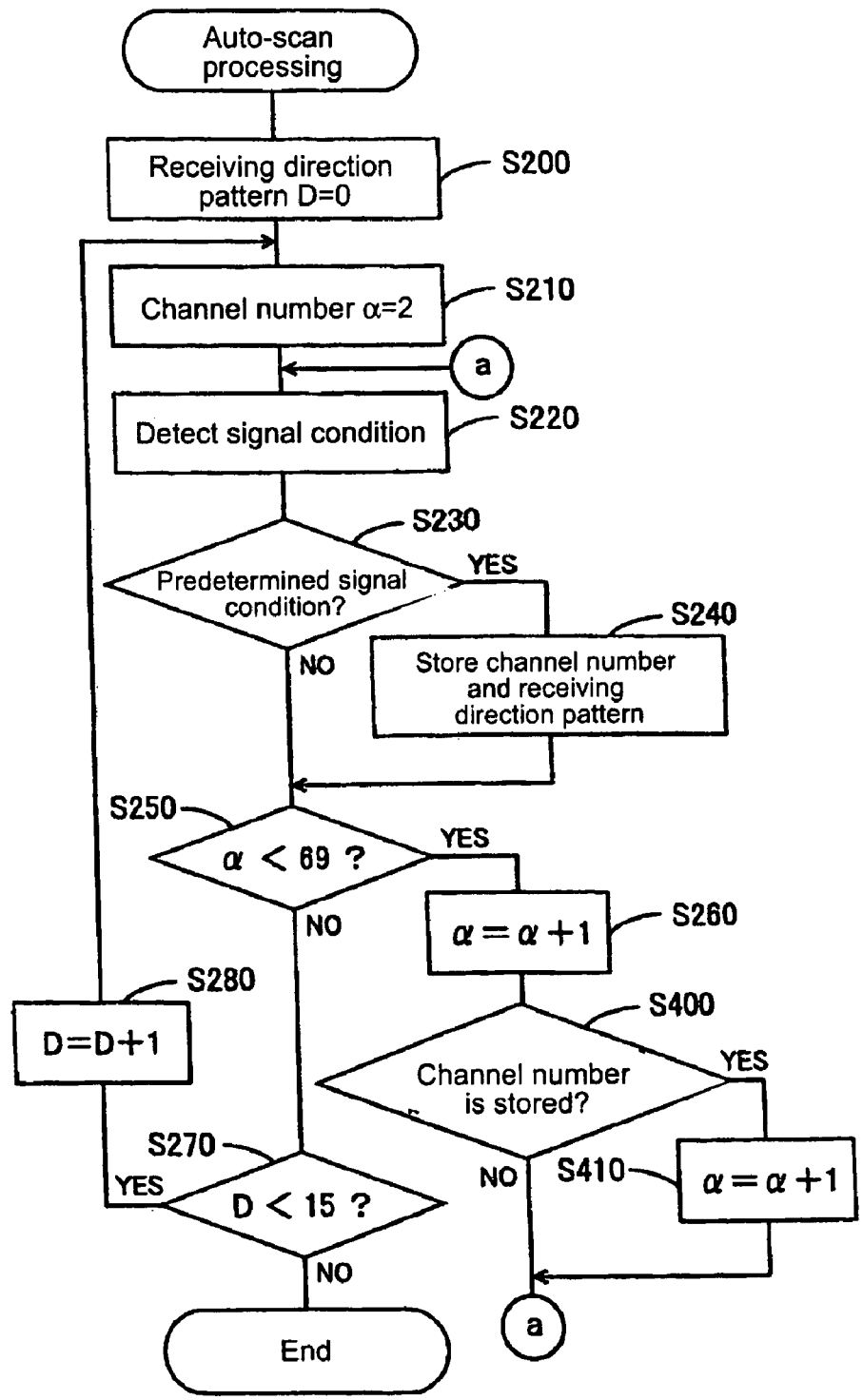
FIG. 8 is a flowchart showing another example of the auto-scan processing.

Now, another example of the main processing to be executed in the television tuner 20 is described. In FIG. 8, after the processing of step S260 is performed, it is checked if the channel number is stored at step S400. This processing checks if the channel number that has been updated at step S260 is already stored in the EEPROM 28d. If the channel number is stored, the value of the channel number is updated to ($\alpha=\alpha+1$. Then, the processing of step S410 is performed, or if it is determined that the channel number is not stored at step S400, control is returned to step S220.

Now, a specific example of the auto-scan processing shown in FIG. 8 is described with reference to FIG. 5. First, the receiving direction pattern is set to D=0 (step S200), and then the channel number is set to $\alpha=2$ (step S210). Then, the signal condition at this channel number is detected (step S220) and the detected signal condition is identified (step S230). As shown in FIG. 5, when the receiving direction pattern is D=0, the signal condition is good when the channel number is $\alpha=14$. In this case, it is determined that the detected signal condition is not the predetermined signal condition, and thus subsequent channel numbers and receiving direction patterns will not be stored.

The signal condition, when the receiving pattern is D=0, is detected and identified, and then the channel number is set to $\alpha=3$ (step S260), the detection and identification of the signal condition is performed for this channel number. According to this procedure, the channel number is incremented by one with the receiving direction pattern fixed at D=0, and the detection and identification of the signal condition is performed for each channel number. When the channel number is $\alpha=14$, the signal condition is good, and thus the channel number ($\alpha=14$) and receiving direction pattern (D=0) for this channel is stored in the EEPROM 28d (step S240). After they are stored, while the channel number is incremented by one, the detection and identification of the signal condition is performed for each channel number, as in the above. When the detection and identification of the signal condition is performed for the channel number $\alpha=69$, the receiving direction pattern is incremented by one and set to D=1 (step S280), and the channel number is switched within the range of $\alpha=2$ to 69. However, since the channel number "$\alpha=14$" is already stored in the EEPROM 28d, the processing of step S410 is performed to further increment the channel number $\alpha$ by one, making it impossible to switch to channel number $\alpha=14$. That is, the channel number switching for the receiving direction pattern D=1 is made within the range of $\alpha=2$ to 13 and 15 to 69. By doing this, switching to a channel number already stored in the EEPROM 28d will not be made nor the detection and identification of the signal condition will be performed, thus making it possible to further increase the execution speed of the auto-scan.

In the above embodiments, the television tuner that receives television broadcast signals with the smart antenna capable of statically selecting the directivity with an electric signal was described. However, the present invention is not limited to the television tuner using the smart antenna, it is possible to implement a television tuner that receives television broadcast signals with an antenna capable of dynamically selecting the directivity. Specifically, for example, a television tuner with a directional antenna that has the directivity in certain direction and that can be rotated on a horizontal surface by means of a drive unit such as a motor may be implemented according to the present invention.

As described above, according to the present invention, the variable directivity control for the antenna can be made by a one-time operation for each direction and thus the execution speed of the auto-scan can be increased.

The foregoing invention has been described in terms of preferred embodiments. However, those skilled, in the art will recognize that many variations of such embodiments exist. Such variations are intended to be within the scope of the present invention and the appended claims.

We claim:

1. A television turner for control of directivity of an antenna, comprising:
   a directivity control section that outputs an electric signal to select a directivity of the antenna, the directivity control section includes:
   plurality of directional antennas coupled with a plurality of phase shifter circuits, with a phase shifter circuit of the plurality of phase shifter circuits controlling a phase shift amount of a signal input from a directional antenna of the plurality of directional antennas and delaying a phase of the signal according to a bias voltage output from the television tuner to control the directivity of the directional antenna for any direction, and for generating a directivity value;
   a tuner section that receives television broadcast signals in a predetermined band from the antenna and outputs an intermediate frequency (I/F) signal;
   a signal condition detector section that detects a signal condition of the I/F signal, with the signal condition based on a channel number of a channel and directivity value;
   if a frequency signal of the I/F signal is a digital frequency signal, the signal condition is determined by detecting a bit error rate; if the frequency signal of the I/F signal is an analog signal, the signal condition is determined by detecting an AGC voltage output;
   a channel storing section that stores the channel number of the channel and the directivity value of the directional antenna as a channel select data if the signal condition of the I/F signal is commensurate with a predetermined signal condition;
   if it is determined that the channel select data is stored, a video signal control processing is executed to display an image, after which, it is determined if an auto-scan start command has been input;
   if it is determined that the channel select data is not stored, it is determined if the auto-scan start command is input;
   if it is determined that the auto-scan start command is input, the auto scan processing is executed;
   the auto-scan processing includes:
   the directivity value of the antenna set to a first directivity value using phase shifter circuits;
   the tuner section receiving data that corresponds with a first channel number for setting the channel to the first channel number;
   the signal condition detector section detecting the signal condition of the I/F signal output form the television tuner based on the set channel number and the directivity value;

determining if the detected signal condition is commensurate with the predetermined signal condition;

if the detected signal condition is commensurate with the predetermined signal condition, the channel storing section storing the set channel number and the set directivity value as the channel select data, after which, it is determined if the set channel number exceeds a predetermined channel number;

if it is determined that the set channel number is less than the predetermined channel number, incrementing the set channel to a higher channel number, and detecting the signal condition based on a newly set channel number; otherwise, determining if the set directivity value is less than a predetermined directivity value; if it is determined that the set directivity value is less than the predetermined directivity value, incrementing the directivity value and resetting the channel to the first channel number.

2. A television turner for control of directivity of an antenna, comprising:

a directivity control section that outputs an electric signal to select a directivity of the antenna, the directivity control section includes:

plurality of directional antennas coupled with a plurality of phase shifter circuits, with a phase shifter circuit of the plurality of phase shifter circuits controlling a phase shift amount of a signal input from a directional antenna of the plurality of directional antennas and delaying a phase of the signal according to a bias voltage output from the television tuner to control the directivity of the directional antenna for any direction, and for generating a directivity value;

a tuner section that receives television broadcast signals in a predetermined band from the antenna and outputs an intermediate frequency (I/F) signal;

a signal condition detector section that detects a signal condition of the I/F signal, with the signal condition based on a channel number of a channel and directivity value;

if a frequency signal of the I/F signal is a digital frequency signal, the signal condition is determined by detecting a bit error rate; if the frequency signal of the I/F signal is an analog signal, the signal condition is determined by detecting an AGC voltage output;

a channel storing section that stores the channel number of the channel and the directivity value of the directional antenna as a channel select data if the signal condition of the I/F signal is commensurate with a predetermined signal condition;

if it is determined that the channel select data is stored, a video signal control processing is executed to display an image, after which, it is determined if an auto-scan start command has been input;

if it is determined that the channel select data is not stored, it is determined if the auto-scan start command is input;

if it is determined that the auto-scan start command is input, the auto scan processing is executed;

the auto-scan processing includes:

the directivity value of the antenna set to a first directivity value using phase shifter circuits;

the tuner section receiving data that corresponds with a first channel number for setting the channel to the first channel number;

the signal condition detector section detecting the signal condition of the I/F signal output form the television tuner based on the set channel number and the directivity value;

determining if the detected signal condition is commensurate with the predetermined signal condition;

if the detected signal condition is commensurate with the predetermined signal condition, the channel storing section storing the set channel number and the set directivity value as the channel select data, after which, it is determined if the set channel number exceeds a predetermined channel number;

if it is determined that the set channel number is less than the predetermined channel number, incrementing the set channel to a first higher channel number and determining if the first higher channel number is stored in the channel storing section;

if it is determined that the first higher channel number is stored in the channel storing section, incrementing the first higher channel number to a second higher channel number, with the signal condition detector section detecting the signal condition based on the second higher channel number and the set directivity value;

if it is determined that the first higher channel number is not stored in the channel storing section, the signal condition detector section detecting the signal condition based on the first higher channel number and the set directivity value;

if it is determined that the set channel number is not less than the predetermined channel number, determining if the set directivity value is less than a predetermined directivity value; if it is determined that the set directivity value is less than the predetermined directivity value, incrementing the directivity value and resetting the channel to the first channel number.

* * * * *